No. 818,174. PATENTED APR. 17, 1906.
C. E. HOLLAND.
PROCESS OF RECLAIMING WASTE GOLD AND OTHER VALUABLE METALS FROM WATER AND OTHER LIQUIDS.
APPLICATION FILED JUNE 5, 1905.
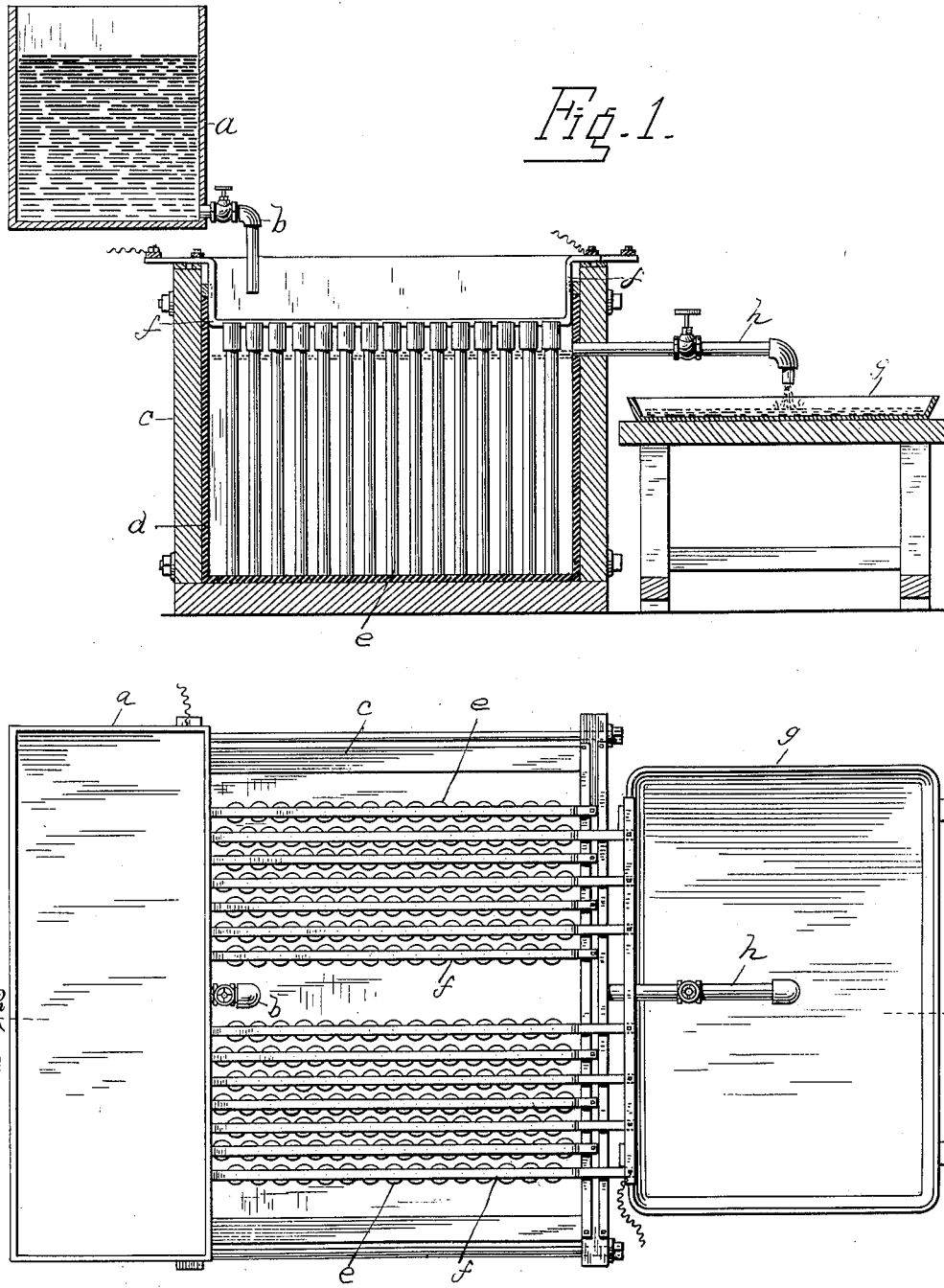

UNITED STATES PATENT OFFICE.

CHARLES E. HOLLAND, OF NEW YORK, N. Y., ASSIGNOR TO THE HOLLAND METAL RECOVERY COMPANY, A CORPORATION OF NEW YORK.

PROCESS OF RECLAIMING WASTE GOLD AND OTHER VALUABLE METALS FROM WATER AND OTHER LIQUIDS.

No. 818,174.     Specification of Letters Patent.     Patented April 17, 1906.

Application filed June 5, 1905. Serial No. 263,898.

*To all whom it may concern:*

Be it known that I, CHARLES E. HOLLAND, a citizen of the United States, residing in the city, county, and State of New York, have invented a new and Improved Process of Reclaiming Gold and Other Valuable Metals from Water and Other Liquids, of which the following is a specification.

This process is intended for employment in reclaiming or recovering precious and other valuable metals from water and other liquids or liquid solutions and compounds, and it is particularly applicable to running streams in the vicinity of gold or silver mines, which usually receive considerable quantities of gold from the mines, and from stamping, concentrating, smelting, and other mills or appliances, such gold running to waste and becoming lost. It is probably true that in the majority of cases stamping-mills combined with amalgamating and concentrating systems lose from twenty to fifty per cent. of their gold or other metals in this manner, that amount going to waste and being absolutely lost.

It is the object of the present invention to reclaim or recover all of the metal which under existing conditions is now lost, so that there will be practically no waste or loss whatever of the metal which reaches the stream or water in the vicinity of the mine or is deposited in any other liquid.

In my process I force or conduct the stream of water into and through a runway or tank in which it is treated by electrolysis, whereby the organic and inorganic matter in suspension or solution is coagulated or precipitated, the coagulations and precipitated matter containing practically all the gold or other metal which would otherwise have run to waste. This product is conducted from the tank or runway to drying tables, tanks, pans, retorts, or similar appliances, where it is subjected to a process of evaporation, decantation, or filtration, leaving the solid matter, of which the gold or other mineral in powdered or granulated form constitutes a part. After the liquid matter has thus been evaporated, decanted, or filtrated off the gold or other metal is separated or extracted by treating the matter with a solution of cyanid of potassium or by any other of the well-known processes of separation.

In the accompanying drawings, Figure 1 is a longitudinal vertical section illustrating an apparatus for carrying out the steps of my process. Fig. 2 is a plan view of the same.

Similar letters of reference indicate corresponding parts.

This apparatus is one which may be employed successfully in practicing my process; but I do not confine myself to its use nor to the construction shown of any of its parts, as I propose to employ any style of electrolytic apparatus or pan or other mechanical means which will successfully carry out the steps of my process.

$a$ represents a reservoir adapted to receive a continuous flow of water, as from a running stream, and to conduct it by means of a suitable outlet $b$ into a tank or runway $c$, constructed of wood or other material and lined with hard rubber $d$ or other non-conductive material. This tank contains positive and negative electrodes $e$, arranged alternately, the poles of the anodes being all on one side of the tank and the poles of the cathodes on the other and the rows of electrodes being supported by metallic bars $f$, and thereby connected with wires connecting with batteries or dynamos. The electrodes may be of any suitable conductive material, such as aluminium or iron, and of any shape, number, or arrangement. They are preferably sufficiently numerous to well fill the tank, and they extend well down toward or to the bottom thereof. $g$ is a pan adapted to receive the product by means of the outlet-pipe $h$.

The water flowing from the reservoir $a$ into the tank is therein subjected to electrolysis, the electric currents from the anodes forming an oxyhydrate, which coagulates or precipitates the organic and inorganic matter in suspension or solution and unites them into an insoluble coagulum or precipitate. The electrochemical action produced in the above process forms a coagulum or precipitate which is conveyed as a product onto the drying-pan $g$, where the liquid is evaporated off, (or it may be filtered or decanted,) after which the precious metal is extracted by any well-known process, as above stated.

Having thus fully described my invention, what I claim, and desire to secure by Letters Patent, is—

1. The process of reclaiming gold or other precious or valuable metals from water or other liquids, consisting in conducting the stream or body of liquid to an electrolytic apparatus, subjecting it to electrolysis, in the presence of a body capable of forming a coagulum, and collecting the coagulum produced thereby.

2. The process of reclaiming gold or other precious or valuable metals from water or other liquids, consisting in conducting the stream or body of liquid to an electrolytic apparatus, subjecting it to electrolysis, in the presence of a body capable of forming a coagulum, and collecting the coagulum and precipitate produced thereby.

3. The process of reclaiming gold or other precious or valuable metals from water or other liquids, consisting in conducting the stream or body of liquid to an electrolytic apparatus, subjecting it to electrolysis, in the presence of a body capable of forming a coagulum, collecting the coagulum produced thereby, and subjecting it to a suitable process for extracting the metal contained therein.

4. The process of reclaiming gold or other precious or valuable metals from water or other liquids, consisting in conducting the stream or body of liquid to an electrolytic apparatus, subjecting it to electrolysis, in the presence of a body capable of forming a coagulum, collecting the coagulum and precipitate produced thereby, and subjecting it to a suitable process for extracting the metal contained therein.

5. The process of reclaiming gold and other precious or valuable metals from water or other liquids, consisting in conducting the stream or body of liquid into and continuously through a runway or tank, subjecting it to electrolysis, in the presence of a body capable of forming a coagulum, while it is passing through the runway or tank and collecting the coagulum produced thereby.

6. The process of reclaiming gold or other precious or valuable metals from water or other liquids, consisting in conducting the stream or body of liquid into and continuously through a runway or tank, subjecting it to electrolysis, in the presence of a body capable of forming a coagulum, while it is passing through the runway or tank and collecting the coagulum and precipitate formed thereby.

7. The process of reclaiming gold and other precious or valuable metals from water or other liquids, consisting in conducting the stream or body of liquid into and continuously through a runway or tank, subjecting it to electrolysis, in the presence of a body capable of forming a coagulum, while it is passing through the runway or tank, collecting the coagulum produced thereby, and subjecting it to a suitable process for extracting the metal contained therein.

8. The process of reclaiming gold and other precious or valuable metals from water or other liquids, consisting in conducting the stream or body of liquid into and continuously through a runway or tank, subjecting it to electrolysis, in the presence of a body capable of forming a coagulum, while it is passing through the runway or tank, collecting the coagulum and precipitate produced thereby, and subjecting it to a suitable process for extracting the metal contained therein.

9. The process of reclaiming gold and other precious or valuable metals from water or other liquids, consisting in conducting the stream or body of water to an electrolytic apparatus, subjecting it to electrolysis, in the presence of a body capable of forming a coagulum, removing the coagulum produced thereby, evaporating, decanting and filtrating off the liquid therefrom, and subjecting the product or residuum to a separating process for the purpose of extracting the metal.

10. The process of reclaiming gold and other precious or valuable metals from water or other liquids, consisting in conducting the stream or body of water into and continuously through a runway or tank, subjecting it to electrolysis, in the presence of a body capable of forming a coagulum, while it is passing through the runway or tank, removing the coagulum produced by the electrolytic process, evaporating, decanting or filtering off the liquid therefrom, and subjecting the product or residuum to a separating process for the purpose of extracting the metal.

11. The process of reclaiming gold and other precious or valuable metals from water or other liquids, consisting in conducting the stream or body of water to an electrolytic apparatus, subjecting it to electrolysis, in the presence of a body capable of forming a coagulum, removing the coagulum and precipitate produced thereby, evaporating, decanting or filtrating off the liquid therefrom, and subjecting the product or residuum to a separating process for the purpose of extracting the metal.

12. The process of reclaiming gold and other precious or valuable metals from water or other liquids, consisting in conducting the stream or body of water into and continuously through a runway or tank, subjecting it to electrolysis, in the presence of a body capable of forming a coagulum, while it is passing through the runway or tank, removing the coagulum and precipitate produced by the electrolytic process, evaporating, decanting or filtering off the liquid therefrom, and subjecting the product or residuum to a separating process for the purpose of extracting the metal.

In testimony whereof I have signed my name to this specification in the presence of two subscribing witnesses.

CHARLES E. HOLLAND.

Witnesses:
  J. M. MALAMENT,
  ROBT. HALL CASSEL.